United States Patent [19]

Tan

[11] 3,882,537

[45] May 6, 1975

[54] COLOR TELEVISION CAMERA AND A STRIP-FILTER SUITABLE THEREFORE

[75] Inventor: Sing Liong Tan, Emmasingel, Eindhoven, Netherlands

[73] Assignee: U.S. Philips Corporation, New York, N.Y.

[22] Filed: Oct. 1, 1973

[21] Appl. No.: 402,453

[30] Foreign Application Priority Data

Oct. 14, 1972 Netherlands ....................... 7213942

[52] U.S. Cl. ................................................... 358/45

[51] Int. Cl. ............................................ H04n 9/06

[58] Field of Search .................... 178/5.4 ST; 358/45

[56] References Cited

UNITED STATES PATENTS

| | | | |
|---|---|---|---|
| 2,932,756 | 4/1960 | Liebscher | 315/21 C |
| 3,745,236 | 7/1973 | Karato | 178/5.4 ST |
| 3,745,237 | 7/1973 | Karato | 178/5.4 ST |

*Primary Examiner*—Robert L. Richardson

*Attorney, Agent, or Firm*—Frank R. Trifari; Simon L. Cohen

[57] ABSTRACT

A color television camera having one pick-up tube and a special strip-filter. The strip-filter comprises a specific index strip-filter and a color strip-filter provided one after the other in a radiation path. The index strip-filter uniformly passes visible light but has opaque strips for IR radiation from a radiation source. The color strip-filter uniformly passes IR radiation but has color filter-strips for visible light. The pick-up tube is thus completely utilized for picking up color information from the scene. Color image signal separation may be effected through frequency separation. The special strip-filter is formed, for example, as a laminated composite strip-filter.

21 Claims, 3 Drawing Figures

COLOR TELEVISION CAMERA AND A STRIP-FILTER SUITABLE THEREFORE

Figure 1:
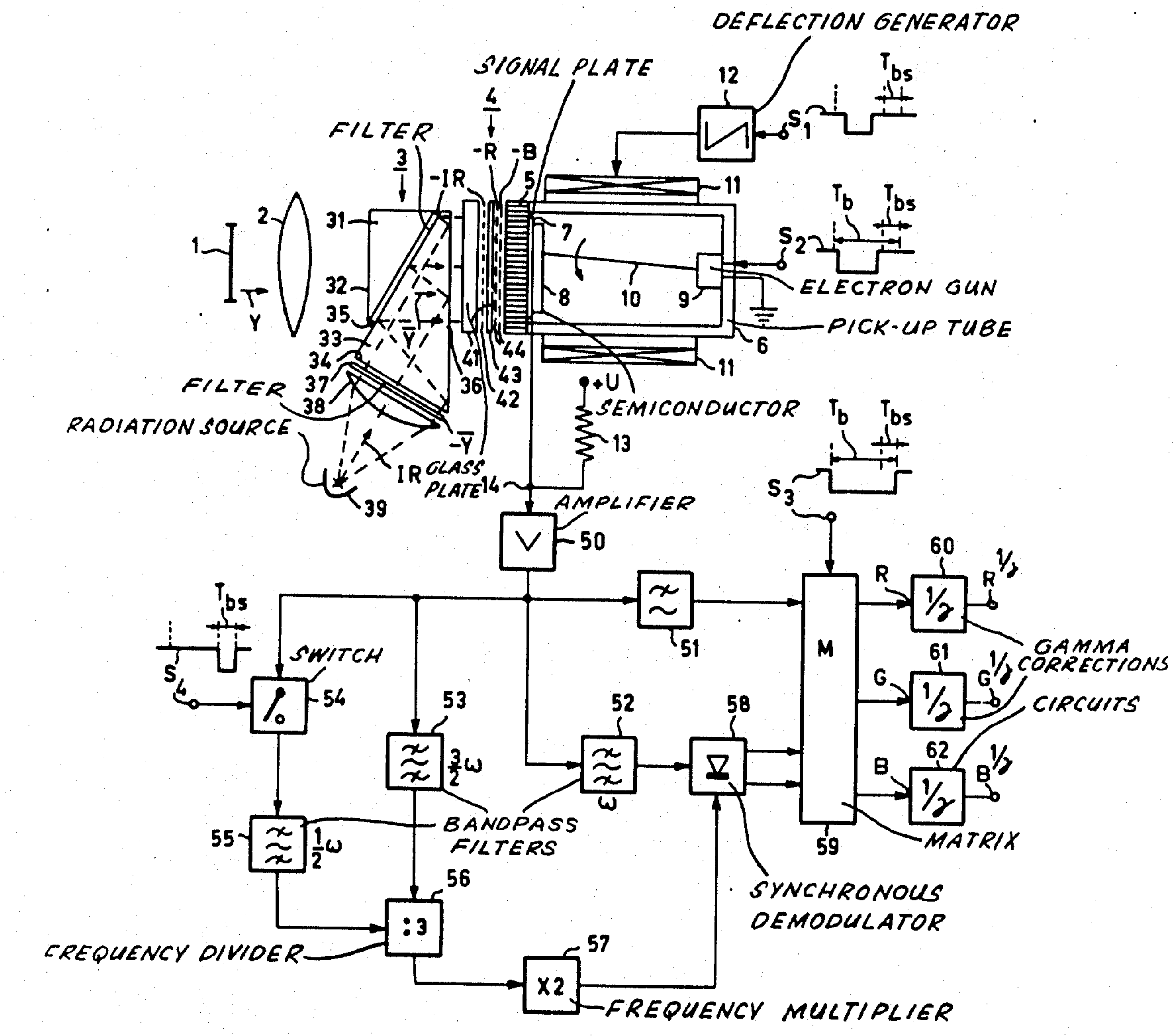

The invention relates to a color television camera provided with a pick-up device for generating color image signals, a strip-filter incorporated before the pick-up device and being formed with strips having different pass characteristics, and a radiation source for providing radiation which is located mainly outside the wavelengh range of visible light, said camera including filter strips which are fomed with groups or color strips distributing the light coming from a scene to be picked up over the pick-up device said light split up in different spectral compositions and with indexing strips giving place-determining information on the pick-up device caused by the radiation from the radiation source. Furthermore the invention relates to a suitable strip-filter.

Such a color television camera is described inter alia in U.S. Pat. No. 2,932,756. This specification states that the strip-filter is formed with groups of three color strips which pass red, blue or green-colored light coming from the scene, which groups are separated by an indexing strip which only passes ultraviolet radiation supplied by the radiation source. A pick-up tube as pick-up device thus supplies sequentially a red, a blue and a green color image signal whose amplitude depends on the local intensity of the light from the scene, and an indexing signal having a fixed amplitude which depends on the uniform exposure of the camera tube given by the radiation source.

Such a color television camera has the following drawbacks.

The indexing strips screen part of the total surface of the camera tube suitable for picking up the scene. In the given embodiment a quarter of the said surface is used for obtaining the indexing information which means that only three-fourths of the scene information is picked up by the pick-up tube.

The requirement is imposed on modern color television cameras that they provide color image signals which are suitable for display by means of standard display devices based on instantaneous color image signal processing. To this end the color image signals generated in a color television camera based on sequential color image signal generation are to be applied to a sequential instantaneous signal converter. In such a converter the indexing information is utilized for the signal conversion. To this end the indexing information must be derived from the composite signal provided by the pick-up tube. Since in the embodiment described in said patent specification the color repetition frequency in the groups of color strips is equal to the index repetition frequency, the indexing information cannot be derived by frequency separation from the composite signal but a signal amplitude separation is to be effected. This is a drawback because amplitude separation is generally less selective than frequency separation and for obtaining a satisfactory amplitude separation of the indexing information the intensity of the ultraviolet radiation source must be so large that the amplitude of the indexing signal is larger under all possible circumstances than the largest possible amplitude of the three color image signals. Therefore the use of the radiation source limits the contrast range of the pick-up tube for visible light.

A primary object of the present invention is to realize a color television camera including one pick-up device for the sequential generation of color image signals in which the entire surface of the pick-up device suitable for generation is utilized. To this end the color television camera according to the invention is characterized in that a common radiation path of the light coming from the scene and of the radiation coming from the radiation source includes a specific index strip-filter and a color strip-filter one after the other, the index strip-filter being provided with successively juxtaposed strips which do not pass and pass radiation or pass more radiation and less radiation from the radiation source, said index strip-filter furthermore uniformly passing the light coming from the scene while the color strip-filter with the groups of strips having different spectral pass characteristics for the light coming from the scene uniformly passes the radiation coming from the radiation source.

The camera according to the invention is particularly suitable for using frequency separation when deriving indexing information from the composite signal provided by the pick-up device. To this end the color television camera according to the invention is furthermore characterized in that the width of a group of color strips of the color strip-filter having different spectral pass characteristics for the light coming from the scene differs from the width of two strips of the index strip-filter passing and not passing radiation or passing more radiation and less radiation from the radiation source.

A strip-filter according to the invention is characterized in that the index strip-filter and the color strip-filter are formed as a laminated composite strip-filter.

Figure 2:
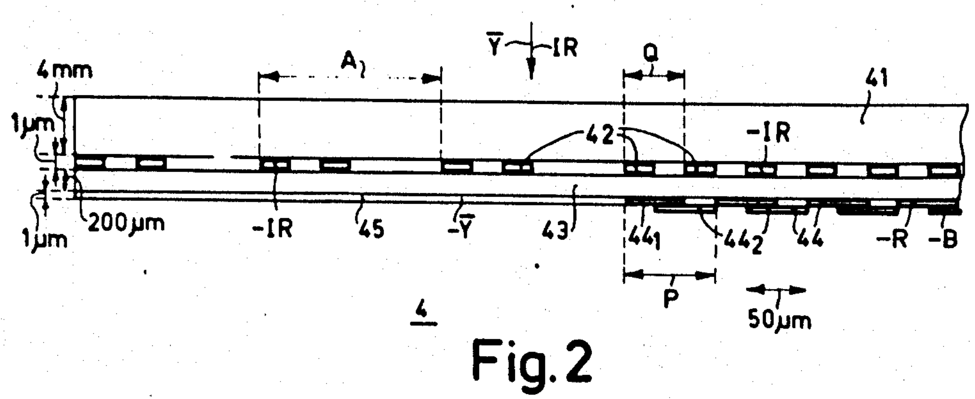
Figure 3:
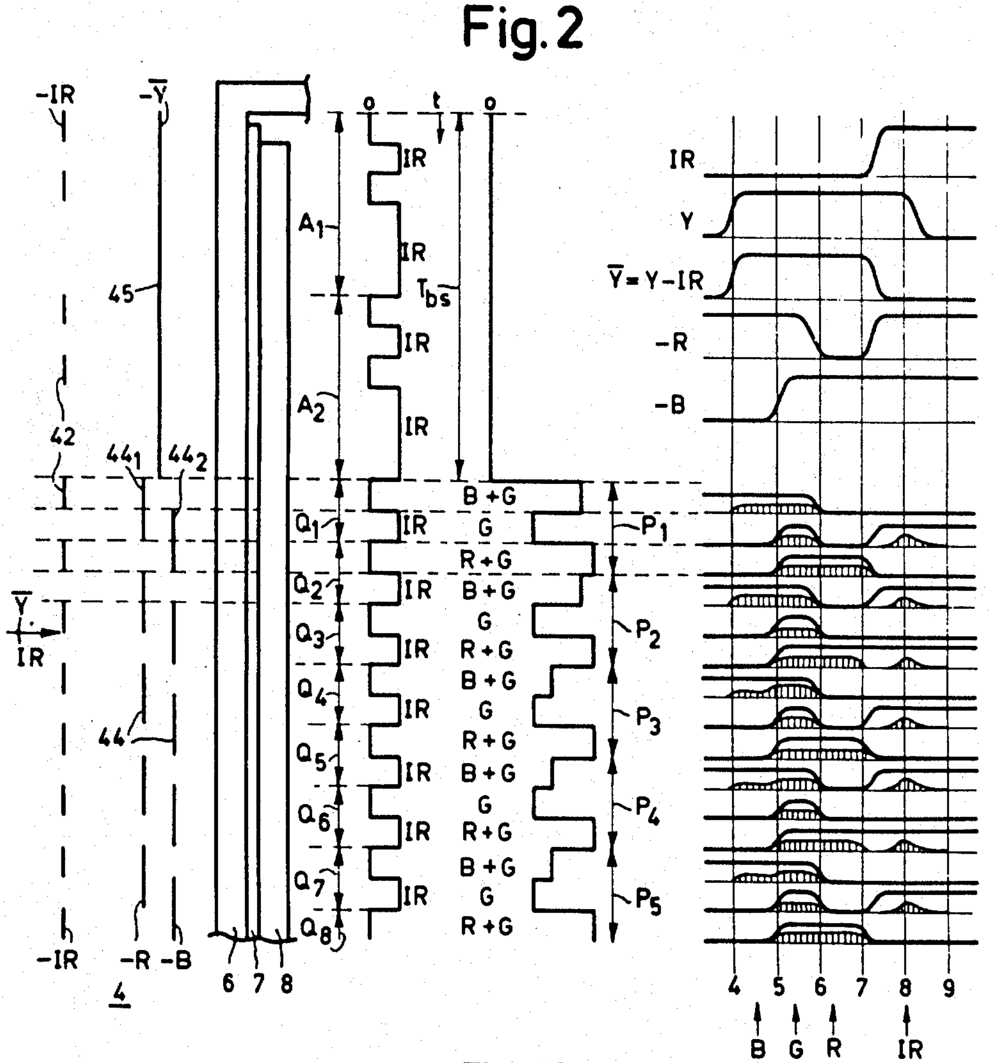

The invention will be further described with reference to the following Figures as examples in which FIG. 1 shows an embodiment of a color television camera according to the invention, FIG. 2 shows an embodiment of a laminated composite strip-filter according to the invention and FIG. 3 shows an embodiment of a strip-filter according to the invention, with some signal and wavelength diagrams.

FIG. 1 shows a color television camera according to the invention for picking up a scene 1. The light coming from the scene 1 is denoted by an arrow Y. The light Y is projected in the camera through an objective lens 2, an optical system 3, a strip-filter 4 according to the invention and a fiber-optical system 5 onto a television pick-up device shown as a pick-up tube 6. Instead of the pick-up embodiment the television pick-up device may be formed as a pick-up panel comprising a semiconductor body. The pick-up tube 6 is diagrammatically shown in a cross-section with some components present therein relevant for the invention. A so-called signal plate is denoted by 7 which is transparent and consists of electrically conducting material. A semiconductor layer 8 is provided on the signal plate 7 in the pick-up tube 6. The free surface of the semiconductor layer 8 faces an electron gun 9 which is suitable for generating an electron beam 10. Deflection means 11 are provided around the pick-up tube 6 which cause the electron beam 10 to scan the semiconductor layer 8 line by line and field by field in the conventional manner. Two successive field periods have an interlaced scanning and together constitute an image period. The deflection means 11 are connected to an output of a deflection signal generator 12 which for the purpose of synchronization is provided with an input at which a synchronizing signal $S_1$ is shown. The signal $S_1$ is shown with a single pulse as a line synchronizing signal whose leading edge introduces the line flyback period, but it also comprises a field synchronizing signal in a manner not shown.

For performing the periodically occurring generation of the electron beam 10 conventional in television the electron gun 9 has an input at which a blanketing signal $S_2$ is shown. The signal $S_2$ includes a single pulse which periodically suppresses as a (line) blanking pulse the electron beam 10. Furthermore the electron gun 9, particularly including a cathode (not shown) supplying the electron beam 10 is connected to ground.

The signal plate 7 is connected outside the pick-up tube 6 to a resistor 13 a connection point of which is connected to a terminal conveying a voltage +U. The terminal conveying the voltage +U forms part of a voltage source not shown whose other terminal is connected to ground. The connection point of the resistor 13 and the signal plate 7 constitutes an output 14 of the pick-up tube 6. The output 14 conveys in a manner to be further described a composite signal including color image signals and an indexing signal, which composite signal depends on the strip-filter 4 developed according to the invention, and the optical system 3.

The optical system 3 is formed with a first prism 31 having a light-incident plane 32 facing the objective lens 2 and a second prism 33 having a radiation-incident plane 34. The two prisms 31 and 33 are separated from each other through a layer 35. A surface of the prism 33 is denoted by 36 which is active as a light and radiation emergence surface of the optical system 3. Furthermore the optical system 3 is provided with a layer 37 present near the radiation-incident surface 34 and a subsequent lens 38. The lens 38 is irradiated by a radiation source 39 which provides radiation located mainly outside the wavelength range of visible light.

In the embodiment of the color television camera according to FIG. 1 the example is shown that the radiation source 39 provides infrared radiation IR. In practice the radiation source 39 may be formed as an incandescent lamp which, however, also provides visible light. To remove the visible light from the radiation provided by the radiation source 39 the layer 37 is provided. The layer 37 is active as a blocking layer having a blocking characteristic ($-\bar{Y}$) which is associated with the wavelength range of visible light. When using a real infrared radiator as a radiation source 39, the blocking layer 37 may be absent.

Instead of IR radiation, ultraviolet radiation UV may be chosen. When using a gas discharge lamp as an UV radiation source the blocking layer 37 must be present for blocking the visible light. In principle any radiation outside the wavelength range of visible light may be used but the choice is dependent on the type of pick-up tube 6 particularly on the choice of the semiconductor layer 8. In fact the semiconductor layer 8 must convert the incident radiation into a potential pattern on the free surface thereof. This is effected in that the incident radiation (and light) influence the local leak resistance in the semiconductor layer 8 so that dependent on the intensity of the radiation the ground potential given through the electron beam 10 to the free surface increases to a positive potential. The subsequent impingement after an image period on the same spot by the electron beam 10 results in a current peak through the resistor 13 by neutralizing the positive charge, which current peak is a measure of the leakage occurring in the image period in the semiconductor layer 8 and hence of the incident radiation (also light). Therefore the radiation must be chosen to be such that it sufficiently influences the semiconductor layer 8. Also other forms of the pick-up tube 6 are possible, for example those formed with photo-emissive layers.

As will be apparent it is essential for the invention that the radiation provided by the radiation source 39 and the light incident on the pick-up tube 6 coming from the scene 1 are located beyond each other's wavelength range. Since also IR radiation occurs in the light Y coming from the scene 1, this radiation is to be removed from the scene light when choosing an IR radiation source 39. This is effected through the layer 35 which is formed with a determined spectral characteristic and is active as a blocking filter (−IR) for the light Y coming from the scene 1 so that only visible light $\bar{Y}$ is passed. The layer 35 is active as a reflector for the IR radiation coming from the radiation source 39.

The layer 35 in the optical system 3 combines the radiation path of the visible light $\bar{Y}$ from the scene 1 with that of the IR radiation from the radiation source 39 to a common radiation path in which the strip-filter 4 according to the invention is incorporated. Successively the strip-filter 4 of FIG. 1 includes a first transparent glass plate 41, an index strip-filter 42, a second transparent glass plate 43 and a color strip-filter 44. The index strip-filter 41 is formed from strips shown in a cross-action which block IR radiation completely or attenuate it to a large extent (−IR). The color strip-filter 44 is formed with two layers of filter strips likewise shown in a cross-section and each having a different spectral blocking characteristic so that, for example, red (−R) and blue (−B) colored light are blocked.

FIG. 2 shows a possible practical embodiment of a laminated composite strip-filter 4. The reference numerals shown in FIG. 1 are also used in FIG. 2. In FIG. 2 the strip-filter 4 according to the invention is furthermore formed with a layer 45 which is active as a blocking layer having a spectral blocking characteristic (−Y) associated with the wavelength range of visible light. The single layer 45 is provided near an edge of the strip-filter 4 so that at that area the color strip-filter 44 formed with two strip layers $44_1$ and $44_2$ is omitted. In the index strip-filter layer 42 some blocking indexing strips, in FIG. 2, three in number, are omitted at the area of the layer 45. As a result a number of indexing strips of the index strip-filter layer 42 constitute three periodically occurring groups in which the width of a group is denoted by A. The groups of indexing strips having a width of A will be found to be active as run-in indexing strips. In the strips of the index strip filter layer 42 provided at the area of the color strip filter 44 the reference Q denotes the width of two strips passing and not passing IR radiation. The two layers $44_{11}$ and $44_2$ with blocking filter strips blocking red (−R) and blue (−B) colored light, respectively, constitute groups of three color strips having different spectral pass characteristics in that the blocking filter strips partly cover each other. The width of a group of color strips is denoted by P. Starting from the fact that visible white light $\bar{Y}$ is built up from a red R, blue B and green G light component it follows for the given −R and −B choice and the given structure in FIG. 2 that in the said groups of color filter strips blue-green (cyan) (B+G), green (G) and yellow (R+G) colored light is passed.

FIG. 2 shows some dimensions as are possible in a practical embodiment of the strip-filter 4. Dichroitic layers 42 and $44_1$, and $44_2$ in a strip form having a thickness of 1 $\mu$m are provided on either side of the transparent glass plate 43 as a support having a thickness of 200 $\mu$m. It follows from a scale of 50 $\mu$m shown in FIG. 2 for the said width that: Q=50 $\mu$m, P=75 $\mu$m and A=150 $\mu$m. Starting from a given number of approximately 200 groups of the color strip-filter 44 it follows for a width per group of P=75 $\mu$m that the crosssection shown in FIG. 2 has a length of approximately 15 mm.

In order to give the strip-filter 4 formed with a thin glass plate 43 as a support for the index strip filter layer 42, the blocking layer 45 and the color strip filter 44 more rigidity it is formed with the transparent glass plate 41 having a thickness of 4 mm. The plates 41 and 43 may be secured to each other by means of an adhesive. To reduce dispersion phenomena in the glass plate 43 it is favorable to maintain its thickness small. It is alternatively possible to provide the index strip-filter layer 42 on the glass plate 41 as a support and the color strip-filter 44 on the then thicker glass plate 43 as a support. Separated from each other the glass plates 41 and 43 with the associated filters 42 and 44 may be placed in the common radiation path. In this case there applies the requirement that the two filters (41, 42) and (43, 44), once being mutually satisfactorily positioned, remain so positioned under all circumstances. A displacement results in an erroneous relationship between indexing information and color information.

FIG. 1 shows that the strip-filter 4 according to the invention, for example, formed as in FIG. 2 is placed before the pick-up tube 6 and is directed through the fiber-optical system 5 onto the signal plate 7 and the semiconductor layer 8. The fiber-optical system 5 prevents loss of definition as may occur in the presence of a normal transparent glass wall of the pick-up tube 6. The fiber-optical system 5 may be formed as an image intensifier for the intensification of incident light and further radiation. Instead of providing the strip-filter 4 outside the pick-up tube 6 it may alternatively be placed within the pick-up tube 6 provided as a pick-up device between the signal plate 7 and the outer wall. In the embodiment of the strip-filter 4 shown in FIG. 2 the glass plate 41 then constitutes the said outer wall of the pick-up tube 6.

The operation of the color television camera according to FIG. 1 formed, for example, with the strip-filter of FIG. 2 will be described with reference to FIG. 3. In FIG. 3 some reference denote the strip-filter 4 and the pick-up tube 6 shown diagrammatically. The signal diagrams of two signals are plotted as a function of time $t$ in FIG. 3 which separately or in combination may occur at the output 14 of the pick-up tube 6 of FIG. 1. When only a uniformly distributed IR radiation is incident on the strip-filter 4 only the signal IR occurs at the output 14. When only visible light $\bar{Y}$ is incident on the strip-filter 4 the composite color image signal B+G, G, R+G, etc., occurs at the output 14. It is shown for the signal IR that there are two groups of run-in indexing strips having a width of $A_1 = A_2 = A$ while for the pairs of strips passing IR radiation and not passing IR radiation the width $Q_1 = Q_2 = Q_3 = \ldots Q$ are given. in FIG. 3 a time $T_{bx}$ is shown in which the information of the groups of run-in indexing strips $A_1$ and $A_2$ occurs in the signal IR. For the composite color image signal B+G, G, R+G, etc. the widths $P_1 = P_2 = P_3 = \ldots = P$ are given for the groups of color strips. It follows from the diagram with the composite color image signal that it has been assumed that relative to the groups of color strips $P_1$ and $P_2$ the blue light component B is reduced at the area of the groups of color strips $P_3$, $P_4$ and $P_5$ (signal B+G).

FIG. 3 furthermore shows some wavelength diagrams plotted along an axis of approximately 400 to 900 nm. The IR wavelength diagram shows that the IR radiation incident on the strip-filter 4 has a wavelength range which extends from approximately 750 nm to higher values. The wavelength diagram Y shows a wavelength range extending from approximately 400 to 820 nm assuming that the light Y from the scene 1 shown in FIG. 1 includes an infrared radiation component. For the visible light $\bar{Y}$ the wavelength diagram $\bar{Y}$ = Y−IR is shown with a wavelength range of approximately 400 to 720 nm. Wavelength diagrams associated with the spectral blocking characteristics of the strip-filters $44_1$ and $44_2$ are denoted by −R and −B. The wavelength diagram −R shows that the strips of the strip-filter $44_1$ block red-colored length with a wavelength range of approximately 560 to 720 nm. The wavelength diagram −B shows that the strips of the strip-filter $44_2$ block blue-colored light with a wavelength range extending from approximately 500 nm to lower values up to the ultraviolet wavelength range.

Furthermore FIG. 3 shows some wavelength diagrams indicating the wavelength ranges associated with the pass characteristics of each filter strip of the strip-filter 4 which is constituted by a combination from the filter strips of the index strip-filter 42 and the color strip filter 44. The structure of the filters 42 and 44 shown in FIG. 3 with the given associated signals IR and B+G, G, R+G, etc. shows that light and radiation in juxtaposed strips is incident on the semiconductor layer 8 of the pick-up tube 6 with the following composition: B+G, G+IR, R+G, B+G+IR, G, R+G+IR etc., with the same sequence in further cycli. In the wavelength diagrams shown for the filter strips the passed wavelength ranges of the visible light $\bar{Y}$ (B, G and R in combinations) and the IR radiation are shaded. It has been assumed that the sensitivity of the semiconductor layer 8 for the entire wavelength range of the visible light $\bar{Y}$ is approximately the same, while it can be derived from the shaded IR wavelength ranges that the sensitivity of the semiconductor layer 8 decreases for higher wavelengths and is negligibly small, for example, at 900 nm.

The wavelength diagrams −R and −B shown in FIG. 3 show that the strip-filters $44_1$ and $44_2$ do not at all exert influence on the IR radiation and thus uniformly pass the IR radiation. Likewise it appears from the wavelength diagram IR that the strip-filter 42 does not at all have any influence on visible light $\bar{Y}$ and thus uniformly passes the visible light. As a result it is achieved that the index strip-filter 42 and the color strip-filter 44 may take any possible form without their influencing each other in any way. This would not be the case if the filters 42 and 44 had common wavelength ranges in their blocking characteristics. This is the case when, for example, the wavelength diagram −R does not have a blocking wavelength range of from 560 to 720 nm but when the blocking extends from 560 nm far into the infra-red wavelength range. The result is that then not only the index strip-filter 42 but also the color strip-filter $44_1$ influences IR radiation so that indexing information with unwanted difference frequencies obtained by multiplication occurs in the output signal at the output 14 of the pick-up tube 6 of FIG. 1.

In FIG. 3 the signals IR and B+G, G, R+G etc. are shown which in combined form occur at the output 14 of the pick-up tube 6 of FIG. 1. The amplitude of the pulsatory signal IR is constant due to the uniform exposure of the semiconductor layer 8 by the radiation source 39. It can be assumed that the signal amplitude shown is associated with the size of the shaded surface of the IR radiation in the wavelength diagrams of FIG. 3. Dependent on the local intensity and composition of the scene light a given signal value occurs for each of the three color filter strips of the groups $P_1, P_2 \ldots P_5$ etc. Also in this case it is assumed that the magnitude of the signal value is dependent on the shaded surface in the wavelength diagrams. Associated with the B+G indicated signal values which are different in the groups $P_1$, $P_2$ and $P_3$, $P_4$, $P_5$ is a smaller shaded B-surface in the wavelength diagrams associated with the latter groups.

The signals IR and B+G, G, R+G, etc. occurring in a combined form at the output 14 can be separated through an arrangement shown in FIG. 1. The output 14 is connected to the input of an amplifier 50. The output of the amplifier 50 is connected to a lowpass filter 51, a bandpass filter 52, a bandpass filter 53 and through a switch 54 to a bandpass filter 55. The bandpass filters 52, 53 and 55 have central pass frequencies shown as radial frequencies with $\omega$, 3/2 $\omega$ and ½ $\omega$, respectively. The bandpass filter 52 has a broad passband and the filters 53 and 55 have a narrow passband. The output of the bandpass filter 53 is connected to a frequency divider 56 whose output is connected to a frequency multiplier 57. The divider 56 which is formed as a 3-to-1 divider and the multiplier 57 multiplying by two constitute a frequency converter (56, 57). A set input of the frequency divider 56 is connected to the output of the bandpass filter 55. The frequency converter (56, 57) derives a signal of the radial frequency $\omega$ from the signal of radial frequency 3/2 $\omega$ given by the filter 53, which signal $\omega$ is applied to an input of a synchronous demodulator 58. The output of the bandpass filter 52 is connected to a second input of the demodulator 58. The demodulator 58 has two outputs each being connected to an input of a matrix circuit (M) 59. A third input of the matrix circuit 59 is connected to the output of the lowpass filter 51. The matrix circuit 59 has three outputs each being connected through a gamma correction circuit 60, 61 or 62 to outputs of the television camera for which signals $R^{1/\gamma}$, $G^{1/\gamma}$ and $B^{1/\gamma}$ are given.

The matrix circuit 59 is active in known manner and the desired signals such as substantially simultaneously occurring color image signals R, G and B are formed by signal combinations from signals applied thereto. FIG. 1 shows that the matrix circuit 59 is formed, for example, with an input for the supply of a signal $S_3$ shown at this input. The signal $S_3$ shown with a single pulse having a period $T_b$ is the line blanking signal laid down in the television standard. The signal $S_3$ is applied in the matrix circuit 59 to clamping circuits not shown so that the circuit 59 does not provide color image signals R, G and B but the so-called black level during the line blanking period $T_b$.

The switch 54 has an input for the supply of a signal $S_4$ shown at this input. The signal $S_4$ with a single periodically occurring pulse shown with the period $T_{bx}$ is active as a switching signal and closes the switch 54 during the period $T_{bx}$. It follows from the signal $S_3$ that the period $T_{bx}$ falls within the standard line blanking period $T_b$ but follows the line blanking pulse in the signal $S_2$ applied to the pick-up tube 6. The period $T_{bx}$ is the period when the electron beam 10 in the pick-up tube 6 scans the semiconductor layer 8 at the area of the run-in indexing strip groups $A_1, A_2 \ldots$ in the index strip-filter 42 of FIG. 3. The normal line scanning is effected after the period $T_{bx}$.

To explain the operation of the arrangement (51–59), the signals IR and B+G, G, R+G etc. of FIG. 3 will be further considered by means of a Fourier-analysis.

A Fourier-analysis of a periodically occurring pulsatory signal having a radial frequency $\omega$, a pulse amplitude $h$ and a pulse duration $2\,k\,\pi$ yields a signal $F(\omega\, t)$ in accordance with the function $$F(\omega\, t) = kh + (2h/\pi)\,(\sin k\,\pi \cos \omega t + (\sin 2\,k\,\pi/2) \cos 2\omega t + \ldots) \qquad (1)$$

When omitting the higher harmonics relative to the fundamental harmonic there follows that:

$$F(\omega\, t) = k\,\pi + (2h/\pi)\sin k\,\pi \cos \omega\, t \qquad (2)$$

For the embodiment of the color strip-filter 44 shown in FIG. 3 there follows that the green light G is present over the entire surface of the semiconductor layer 8 intended for picking up the scene 1; here $k = 1$. This is not the case for the blue light B and the red light R which occurs distributed in a strip form and mutually shifted over one-third of the surface of the semiconductor layer 8. The blue light component B associated with the color strips having the spectral pass characteristic B+G occurs in each group of color strips $P_1, P_2 \ldots$ over one-third part so that for the Fourier-analysis there follows that k = ⅓. Likewise there follows for the red light component R (occurring in R+G) that k = ⅓. Assuming that the scanning repetition frequency of the color strips having the spectral pass characteristic B+G and R+G is equal to $(\omega/2\,\pi)$ there follows that the radial frequency for both is equal to $\omega$, while a phase difference of 120° occurs between the two.

It follows from the foregoing and formula (2) with $h$ being equal to $G$, $R$ or $B$ that for the composite color image signal B+G, G, R+G etc.

$$F_1 = G + (R/3) + (B/3) + (R\ \sqrt{3}/\pi)\cos \omega\, t + (B\ \sqrt{3}/\pi)\cos(\omega\, t - 120°) \qquad (3)$$

For the groups of strips $Q_1, Q_2 \ldots$ of the index strip-filter 42 and the resultant signal IR of FIG. 3 there follows that the radical scanning repetition frequency is equal to $P/Q\,.\,\omega = 3/2\omega$, while $k = ½$. When $h$ is equal to IR follows with the aid of formula (2) for the indexing signal IR that: $F_2 = ½\, IR + (2/\pi)\, IR \cos 3/2\ \omega$ (4)

Thus a composite color image signal together with an indexing signal occurs at the output 14 of the pick-up tube 6 of FIG. 1 which signal is given by the formulas (3) plus (4) and leads to $$F_3 = G + (R/3) + (B/3) + ½\,IR + R\ \sqrt{3}/\pi \cos \omega t + (B\ \sqrt{3}/\pi) \cos (\omega t - 120°) + (2/\pi)\,IR \cos (3/2)\,\omega t \quad (5)$$

From formula (5) in FIG. 1 there follows the signal separation for the signal $F_3$ which is provided outside the period $T_b$ by the amplifier 50. The lowpass filter 51 separates the signal component G + (R/3) + (B/3) + ½IR and passes it on to the matrix circuit 59. The bandpass filter 52 separates the signal component $(R\ \sqrt{3}/\pi) \cos \omega t + (B\ \sqrt{3}/\pi) \cos (\omega t - 120°)$ for supply to the synchronous demodulator 58. The bandpass filter 53 separates the signal component $(2/\pi)$ IR cos $(3/2)\,\omega t$ from which via the frequency divider 56 (: 3) and the frequency multiplier 57 (× 2) a signal of the radial frequency ω is derived and is applied to the synchronous demodulator 58. This provides after the synchronous demodulation a signal $(R\ \sqrt{3}/\pi)$ and $(B\ \sqrt{3}/\pi)$ for the matrix circuit 59.

The matrix circuit 59 derives the output signals G, R and B from the signals $G + (R/3) + (B/3) + ½$ IR, $(R\ \sqrt{3}/\pi)$ and $(B\ \sqrt{3}/\pi)$ applied thereto. The signal component ½ IR is a constant voltage or current which can be simply subtracted due to the constant and uniform exposure given by the radiation source 39 in cooperation with the optical system 3.

For the described synchronous demodulation the fact is not being taken into account that the signal provided by the frequency converter (56, 57) with the radial frequency ω does not have a uniform given phase but that it may be 120° or 240° shifted. An incorrect demodulation then takes place. To determine the correct phase the groups of run-in index strips $A_1, A_2$ . . . are provided whose information in the period $T_{bx}$ is processed by the electron beam 10. The signal IR shown in FIG. 3 in the period $T_{bx}$ may be considered to be built up from a first series of pulses as is plotted for the groups $Q_1, Q_2$ . . . plus a second series of pulses having a duration of $(Q/2)$ and a repetition period of 3Q. As compared with the series of pulses in the groups $Q_1, Q_2, Q_3$, . . . this means that the said second pulse series would have pulses which prevent the negatively directed pulses in the first half of the group $Q_3, Q_6, (Q_9)$ etc.

For the first pulse series formula (4) is derived from formula (2) with $k = ½$ and a radial frequency of $(3/2)\omega$. For the second pulse series there follows for a pulse repetition frequency of an ½ ω (period is 3Q) that k is equal to (Q/2) divided by 3Q, or k = 1/6. For the second pulse series there follows from formula (2) with h = IR that:

$$F_4 = (1/6)\ \mathrm{IR} + (1/\pi)\ IR \cos ½\ \omega t \quad (6)$$

For the signal IR in the period $T_{bx}$ there follows from formulas (4) plus (6) that:

$$F_5 = ⅔\ \mathrm{IR} + (1/\pi)\ IR \cos ½\ \omega t + (2/\pi)\ IR \cos (3/2)\ \omega t \quad (7)$$

It follows from formula (7) and FIG. 1 that during the period $T_{bx}$ the bandpass filter 55 passes through the closed switch 54 the signal component $(1/\pi)$ IR cos ½ ω t and the bandpass filter 53 passes the signal component $(2/\pi)$ IR cos $(3/2)\,\omega t$ to the frequency divider 56. The signal of the radial frequency ½ ω derived from the filter 55 and applied to the set input of the frequency divider 56 accurately lays down the phase of the output signal from the divider 56 so that the synchronous demodulator 58 receives through the frequency multiplier 57 a signal of the radial frequency ω in the correct phase.

The switch 54 is provided so as to ensure that the frequency divider 56 is set to the correct phase only during the period $t_{bx}$ when the information from the run-in index strips occurs in the output signal from the pick-up tube 16. In the absence of the switch 54 it is possible that information occurring in the scene 1 appears at the output 14 as a signal having a radial frequency of ½ ω so that an erroneous displacement of the frequency divider 56 might follow.

Some frequencies and bandwidths are given as examples. When using 200 groups of color strips $P_1, P_2 \ldots P_{200}$ there applies that for a line scan period of approximately 50 μs the scanning repetition frequency of the color strip groups is equal to $(\omega/2\pi) = (200/50) \cdot 10^6$ = 4MHz. An indexing frequency of 6 MHz and a run-in set frequency of 2 MHz is associated therewith. The lowpass filter 51 has, for example, a bandwidth of from 0 to 3 MHz while the bandpass filter 52 about the central frequency of 4 MHz has a bandwidth of + and − 0.9 MHz. For the bandpass filters 53 and 55 there applies that they have, for example, a bandwidth of 1% resulting in bandwidths of + and − 60 and 20 kHz, respectively. Such a bandwidth is sufficient to be able to process a possibly occurring line scan which does not take place completely linearly. The necessity of the switch 54 is apparent because the 2 MHz run-in set frequency falls within the 3 MHz bandwidth of the lowpass filter 51 a 2 MHz component may occur in the picture contents of the color image signal supplied by amplifier 50.

The frequency separation described with reference to FIG. 1 and performed on the signal at the output 14 of the pick-up tube 6 is made possible by choosing the width Q of the pairs $Q_1, Q_2$ . . . of indexing strips passing radiation and not passing radiation or passing more and passing less IR radiation to be different from the width P of the groups $P_1, P_2$ . . . of color filter strips. If instead of the manner described in FIG. 3 the index strip filter 42 had impermeable indexing strips covering in each group of color strips for example the B+G and G strips the indexing information would occur behind each R+G color strip. The scanning repetition frequency of the indexing strips has then become equal to that of the color strips so that there is no frequency separation possible but a less selective amplitude separation must be used. For this purpose the intensity of the radiation source 39 is to be many times larger than in the case of the frequency separation and the radiation may detrimentally influence the sensitivity of the pick-up tube 6 to visible light.

A selective frequency separation and a simple synchronous demodulation is possible by the choice with Q = 2/3 P from which follows that the indexing information with a radial frequency of 3/2 ω occurs relative to the color information having a radial frequency of ω. An opaque indexing strip 42 need not cover half the width Q in this case, but another section is just as well possible.

Instead of locating the indexing strips of the filter 42 and the color strips of the filter 44 in the same direction in the manner shown, different configurations are alternatively possible for which, for example, two indexing frequencies are generated. Adaptation of the width $Q$ in the index strip filter 42 calculated in the line scan direction may yield any desired indexing frequency.

The single pick-up tube 6 for generating the color information may be combined with a separate pick-up tube for generating brightness information so that a two-tube camera is formed.

The choice of forming the color strip filter layers $44_1$ and $44_2$ with a red and a blue blocking characteristic −R, −B, respectively, provides the advantage that the green light component G of the scene light occurs over the entire surface of the semiconductor layer 8 intended for picking up the scene. As a result the color image signal G has a larger definition upon display than the color image signals R and B, which is favorable because the eye is most sensitive to green light.

What is claimed is:

1. A color television camera for imaging an object illuminated with visible radiation comprising an image detector sensitive to light in the visible range and outside the visible range, a source of light radiation having a frequency outside the visible range, means for projecting the light from the source to the image detector through an optical path, said optical path comprising first and second portions, means for projecting an image of the illuminated object to the image detector along an optical path including a third portion spatially separated from said first portion and including said second portion, a specific index strip-filter in the second portion and provided with alternating filter strips and clear areas that both affect visible light in the same manner, said strip-filter stripes suppressing radiation outside the visible range, and a color strip-filter serially aligned with the specific index filter in the second portion of the optical paths and having sequentially arranged colored stripes that separate the visible radiation from said image into at least two separate spectral components and pass radiation outside the visible range uniformly.

2. A color television camera as claimed in claim 1, wherein the width of a group of colour strips of the colour strip-filter having different spectral pass characteristics for the light coming from the scene differs from the width of a pair of strips of the index strip filter.

3. A color television camera as claimed in claim 2, wherein the width of a pair of adjacent indexing strips is equal to two-thirds of the width of a group of color strips.

4. A color television camera as claimed in claim 2, further comprising a lowpass filter, a first bandpass filter having a central pass frequency equal to a scanning repetition frequency of the color strips and a second bandpass filter having a central pass frequency which is equal to a scanning repetition frequency of the indexing strips, a frequency converter, a synchronous demodulator, the output of the second bandpass filter being connected through said frequency converter to an input of said synchronous demodulator to a second input of which the output of the first bandpass filter is connected, a matrix circuit having three outputs, two outputs of the synchronous demodulator and the output of the low-pass filter being connected to said matrix circuit and means connecting the low-pass filter, the first bandpass filter and the second bandpass filter to said image detector of said camera.

5. A color television camera as claimed in claim 1, wherein a number of strips is provided near an edge of the index strip-filter while the width of some groups of periodically occurring strips deviates from the width of pairs of strips which are further remote from the said edge of the index strip-filter.

6. A color television camera as claimed in claim 5, wherein the said groups of periodically occurring strips occurring near the edge of the index strip-filter with a deviating width fall beyond the colorstrip-filter further comprising a blocking layer is present at that area whose spectral blocking characteristic is associated with the visible wavelength range of light coming from the scene.

7. A color television camera as claimed in claim 5, further comprising a switch, a bandpass filter connected in series with the switch, the output of the image detector device in the camera being connected to the series arrangement of said switch and said bandpass filter, the bandpass filter having a central pass frequency which is equal to the fundamental harmonic occurring in the scanning repetition frequency of the said indexing strips provided on the edge of the index strip-filter, said switch having an input for the supply of a switching signal for periodically closing the switch, a frequency divider, the output of the series arrangement being connected to a set input of the frequency divider incorporated in a frequency converter in the camera.

8. A color television camera as claimed in claim 7, wherein the radiation source is an infrared radiation source having a wavelength range for the infrared radiation which is essentially outside the wavelength range of the visible light.

9. A color television camera as claimed in claim 1, wherein the color stripfilter is built up from two layers with filter strips, each strip layer being formed with blocking filter strips having a determined spectral blocking characteristics for the light coming from the scene, the spectral blocking characteristic for the two layers being different while the blocking filter strips of one strip layer and the other strip layer partly cover each other, the width of a color strip group corresponding to the total width of two blocking filter strips partly covering each other.

10. A color television camera as claimed in claim 9, wherein the blocking filter strips of one and the other strip layer have a spectral blocking characteristic associated with the wavelength range of red and blue colored light.

11. A color television camera as claimed in claim 1, wherein the camera includes a blocking filter whose blocking characteristic mainly corresponds to the wavelength range of the radiation coming from the radiation source, said blocking filter being incorporated in the third portion of the radiation path of the light coming from the scene.

12. A color television camera as claimed in claim 11, wherein the camera is formed with an optical system having two radiation incident surfaces and a light and radiation emergence surface while the radiation path between each incident surface and the emergence surface incorporates a layer having a different spectral characteristic, this layer between the light incident surface and the emergence surface being a blocking filter having a blocking characteristic associated with the wavelength range of the radiation originating from the radiation source and being reflecting for the radiation coming from the radiation source between the radiation incident surface and the emergence surface.

13. A strip-filter suitable for use in a color television camera comprising an index strip-filter, and a color strip-filter both formed as a laminated composite strip-filter.

14. A strip-filter as claimed in claim 13, wherein the laminated composite strip-filter is formed with at least a transparent plate as a support one side of which supports the index strip-filter and the other side supports the color strip-filter.

15. A strip-filter as claimed in claim 13, wherein the index strip-filter layer is formed with successively juxtaposed strips passing radiation and suppressing radiation outside the visible wavelength range of light, said index strip-filter layer furthermore uniformly passing visible light while the color stripfilter layer with groups of strips of different spectral pass characteristics for visible light uniformly passes the radiation located outside the visible wavelength range of light.

16. A strip-filter as claimed in claim 15, wherein the width of a group of color strips of the color strip-filter layer being different spectral pass characteristics for visible light differs from the width of a pair of strips of the index strip filter layer passing radiation and not passing radiation or passing more radiation and less radiation.

17. A strip-filter as claimed in claim 16, wherein the width of a pair of indexing strips is equal to two-thirds the width of a group of color strips.

18. A strip-filter as claimed in claim 14, wherein a number of strips is provided near an edge of the index strip-filter layer whose width of some groups of periodically occurring strips deviates from the width of the pairs of strips which are further remote from the said edge in the index strip-filter layer.

19. A strip-filter as claimed in claim 18, wherein said groups of periodically occurring strips located near the edge of the index strip-filter layer having a deviating width fall beyond the color strip-filter layer while a blocking layer is present at that area whose spectral blocking characteristic corresponds to the frequency spectrum of visible light.

20. A strip-filter as claimed in claim 13, wherein the color strip-filter layer is buily up from two layers with filter strips, each strip layer being formed with blocking filter strips having a determined blocking characteristic for visible light, the spectral blocking characteristic for the two layers being different while the blocking filter strips of one and the other strip layer partly cover each other, the width of a color strip group corresponding to the total width of two blocking filter strips partly covering each other.

21. A strip-filter as claimed in claim 20, wherein the blocking filter strips of one and the other strip layer have a spectral blocking characteristic which is associated with the wavelength range of red and blue colored light.

* * * * *